(12) United States Patent
Joshi et al.

(10) Patent No.: US 11,709,901 B2
(45) Date of Patent: **\*Jul. 25, 2023**

(54) PERSONALIZED SEARCH FILTER AND NOTIFICATION SYSTEM

(71) Applicant: Oath Inc., New York, NY (US)

(72) Inventors: Preetam Joshi, Sunnyvale, CA (US);
Suju Rajan, Sunnyvale, CA (US);
Amit Phadke, Santa Clara, CA (US);
Vishesh Joshi, Santa Clara, CA (US);
Victor Laguna, San Jose, CA (US);
Christopher Chi Kai Lam, Cupertino, CA (US)

(73) Assignee: YAHOO ASSETS LLC, New York, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 16/707,020

(22) Filed: Dec. 9, 2019

(65) Prior Publication Data
US 2020/0110785 A1 Apr. 9, 2020

Related U.S. Application Data

(63) Continuation of application No. 14/501,342, filed on Sep. 30, 2014, now Pat. No. 10,503,793.

(51) Int. Cl.
*G06F 16/9535* (2019.01)
*G06F 16/33* (2019.01)

(52) U.S. Cl.
CPC ...... *G06F 16/9535* (2019.01); *G06F 16/3338* (2019.01)

(58) Field of Classification Search
CPC .......... G06F 16/9535; G06F 16/3338
USPC ........................................ 707/732
See application file for complete search history.

(56) References Cited

U.S. PATENT DOCUMENTS

| | | | |
|---|---|---|---|
| 7,925,649 B2* | 4/2011 | Jeh | G06F 16/951 707/726 |
| 2007/0061303 A1* | 3/2007 | Ramer | G06F 16/951 |
| 2009/0299976 A1* | 12/2009 | Dexter | G06F 16/8373 |
| 2010/0198857 A1* | 8/2010 | Metzler | G06Q 30/02 705/14.54 |
| 2011/0246457 A1* | 10/2011 | Dong | G06Q 10/06 707/725 |
| 2012/0254310 A1* | 10/2012 | Kamimaeda | G06F 16/437 709/204 |
| 2013/0018896 A1* | 1/2013 | Fleischman | G06F 16/40 707/748 |

(Continued)

*Primary Examiner* — Hosain T Alam
*Assistant Examiner* — Nicholas E Allen
(74) *Attorney, Agent, or Firm* — Cooper Legal Group LLC

(57) ABSTRACT

One or more techniques and/or systems for sending push notifications of content items to client devices are provided herein. For example, an input received from a user can be expanded to obtain an expanded user interest. Content items from a content source can be filtered based upon the expanded user interest to obtain a set of filtered content items. A push notification can be constructed to comprise one or more of the filtered content items from the set of filtered content items. The push notification can be sent to a client device of the user for display as a device alert notification. In an example, the filtered content items, within the push notification, may be ranked based upon a ranking metric.

20 Claims, 12 Drawing Sheets

(56) References Cited

U.S. PATENT DOCUMENTS

| | | | |
|---|---|---|---|
| 2013/0204825 A1* | 8/2013 | Su | G06N 20/00 706/46 |
| 2013/0262478 A1* | 10/2013 | Kemp | G06Q 30/02 707/748 |
| 2013/0297581 A1* | 11/2013 | Ghosh | G06F 16/337 707/706 |
| 2013/0304818 A1* | 11/2013 | Brumleve | G06Q 30/02 709/204 |
| 2013/0346205 A1* | 12/2013 | Hogg | G06F 16/9537 705/14.58 |
| 2014/0040285 A1* | 2/2014 | Rubinstein | G06Q 50/01 707/751 |
| 2014/0057606 A1* | 2/2014 | Kunjithapatham | H04L 51/14 455/412.2 |
| 2014/0057659 A1* | 2/2014 | Udeshi | H04W 4/029 455/456.3 |
| 2014/0080428 A1* | 3/2014 | Rhoads | G06F 16/5838 455/88 |
| 2014/0122456 A1* | 5/2014 | Dies | G06F 16/24578 707/706 |
| 2014/0189539 A1* | 7/2014 | St. Clair | G06Q 30/0241 715/753 |
| 2014/0214833 A1* | 7/2014 | Ozonat | G06F 16/355 707/737 |
| 2014/0245352 A1* | 8/2014 | Tseng | H04N 21/4668 725/40 |
| 2014/0280214 A1* | 9/2014 | Han | G06F 16/9535 707/748 |
| 2014/0280549 A1* | 9/2014 | Rajan | H04L 67/306 709/204 |
| 2016/0092581 A1* | 3/2016 | Joshi | G06F 16/3338 707/732 |

* cited by examiner

PERSONALIZED SEARCH FILTER AND NOTIFICATION SYSTEM

RELATED APPLICATION

This application claims priority to and is a continuation of U.S. application Ser. No. 14/501,342, filed on Sep. 30, 2014, entitled "PERSONALIZED SEARCH FILTER AND NOTIFICATION SYSTEM", which is incorporated herein.

BACKGROUND

The rate at which information is created in the world today continues to increase. There is so much information that cataloging/indexing and accessing the content becomes a challenge. Data processing tools and techniques attempt to address how information is continually being created, identified, collected, stored, shared, and/or analyzed. Content sources, such as databases and data repositories, are commonly employed to contain a collection of information as content items. A wide variety of different types of content items are available from various content sources. Content items may contain text, images, videos, combinations thereof, and so forth. These different types of content items may pertain to different domains. Search engines may attempt to locate and provide access to content item that may be relevant to a user's search query. With so much information and different types of content items being available from different content sources, the search ecosystem is frequently adjusted in an attempt to more accurately identify content items that users may be seeking. Unfortunately, the user may resubmit a search query on an hourly, daily, and/or weekly basis in order to obtain search results comprising recent content items.

SUMMARY

In accordance with the present disclosure, one or more systems and/or methods for sending a push notification of content items to client devices and/or for matching a content item to a shard of users are provided. In an example of sending a push notification of content items to client devices, an input may be received from a user. The input may be expanded to obtain an expanded user interest. Content items from a content source can be filtered based upon the expanded user interest to obtain a set of filtered content items. One or more of the filtered content items from the set of filtered content items may be constructed into a push notification. The push notification may be sent to the client device of the user for display as a device alert notification. In an example, the input may comprise a search query comprising a term or a phrase. In an example, the input may be expanded to identify a term within the input. A co-occurring term, that occurs within a content item and co-occurs with the term, can be identified. In an example, the input can be processed though at least one of a categorizer or a topic model to obtain a topic or category associated with the input. In an example, the set of filtered content items can be ranked based upon a ranking metric to create a ranked set of filtered content items. The filtered content items can be ordered based upon the ranked set of filtered content items. In an example, at least one of a gradient boosting decision tree (GBDT) or an xquery data model (XDM) is used to rank the set of filtered content items.

In an example, the client device can be a mobile device. The push notification can be sent to an operating system of the mobile device. The push notification can comprise instruction for the operating system to display the one or more filtered content items as the device alert notification. In an example, the filtered content items, of the ranked set of filtered content items, can be maintained within a cache. A cache expiration period can be defined for the cache. The filtered content items can be removed from the cache responsive to the expiration of the cache expiration period for a filtered content item. The cache expiration period can be between about a 6 hour expiration to about a 48 hour expiration, or any other expiration time period. In an example, a filtered content item, within the ranked set of filtered content items, comprises at least one of a news article, a sport statistic, product pricing information, a travel deal, a social network post, or a stock update. In an example, one or more filtered content items from the push notification are rated.

In an example of matching a content item to a shard of users, a first content stream can be combined with a second content stream to generate an aggregated content source. The aggregated content source may comprise a set of content items. A first feature may be extracted from a first content item in the set of content items. The first feature of the first content item may be matched to a first user feature for a first shard of users to obtain a recommended content item for the first shard of users. In an example, the recommended content item and a user identifier for a user within the first shard of users can be sent to a cache component. In an example, the first content feature from the first content item can be matched to the first shard of users having the first shard of user features by utilizing a dot product. In an example, the recommended content item from a set of recommended content items can be filtered based upon a comparison of a user interest of a first user from within the shard of user to the first content feature to obtain a set of filtered content items. The set of filtered content items may be ranked based upon a ranking metric to create a ranked set of filtered content items. In an example, a push notification may be constructed to comprise one or more filtered content items from the ranked set of filtered content items. The push notification may be sent to a client device of a first user from within the first shard of users for display as a device alert notification (e.g., a banner, a badge, a vibration, etc.).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
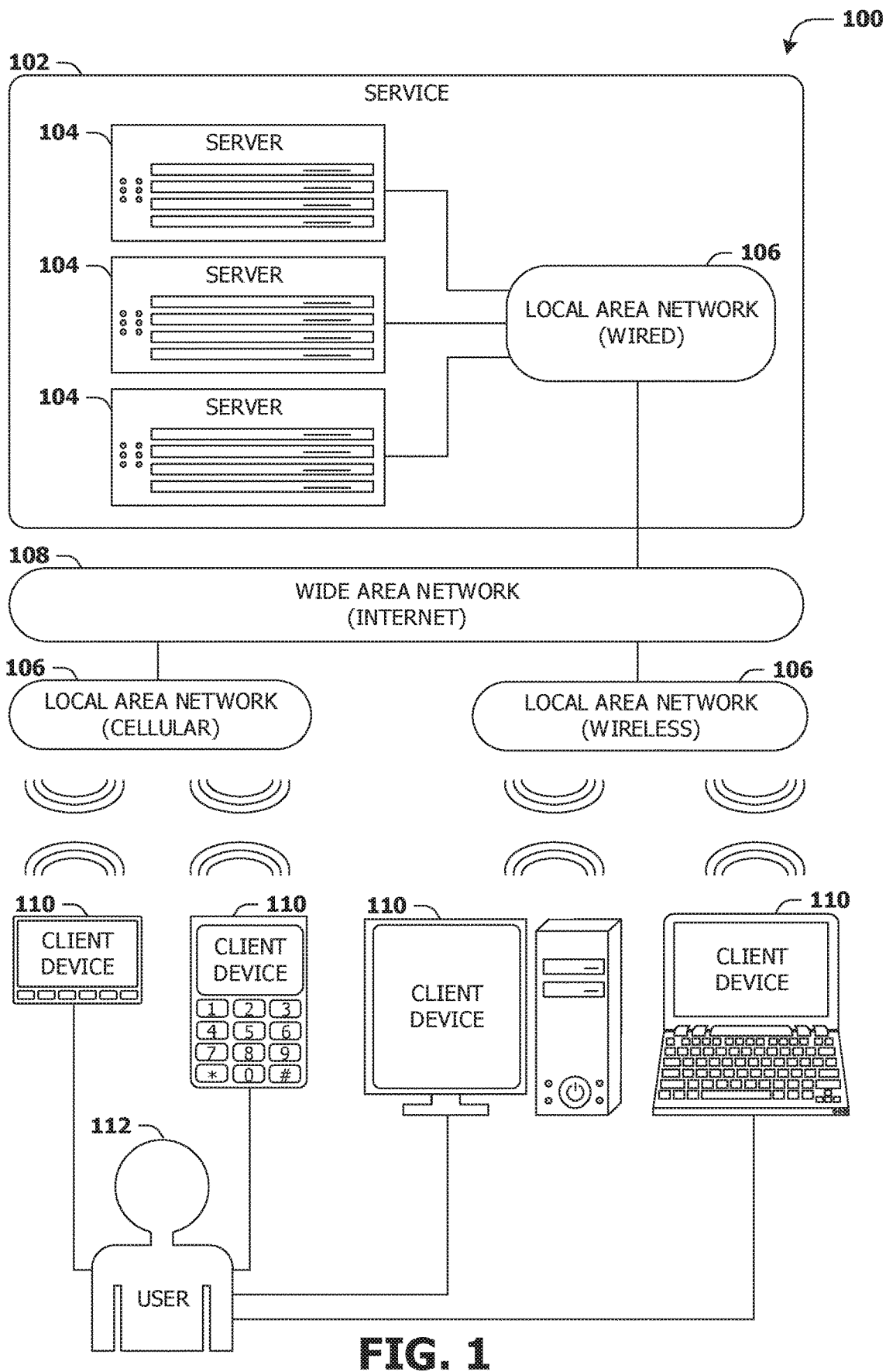
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
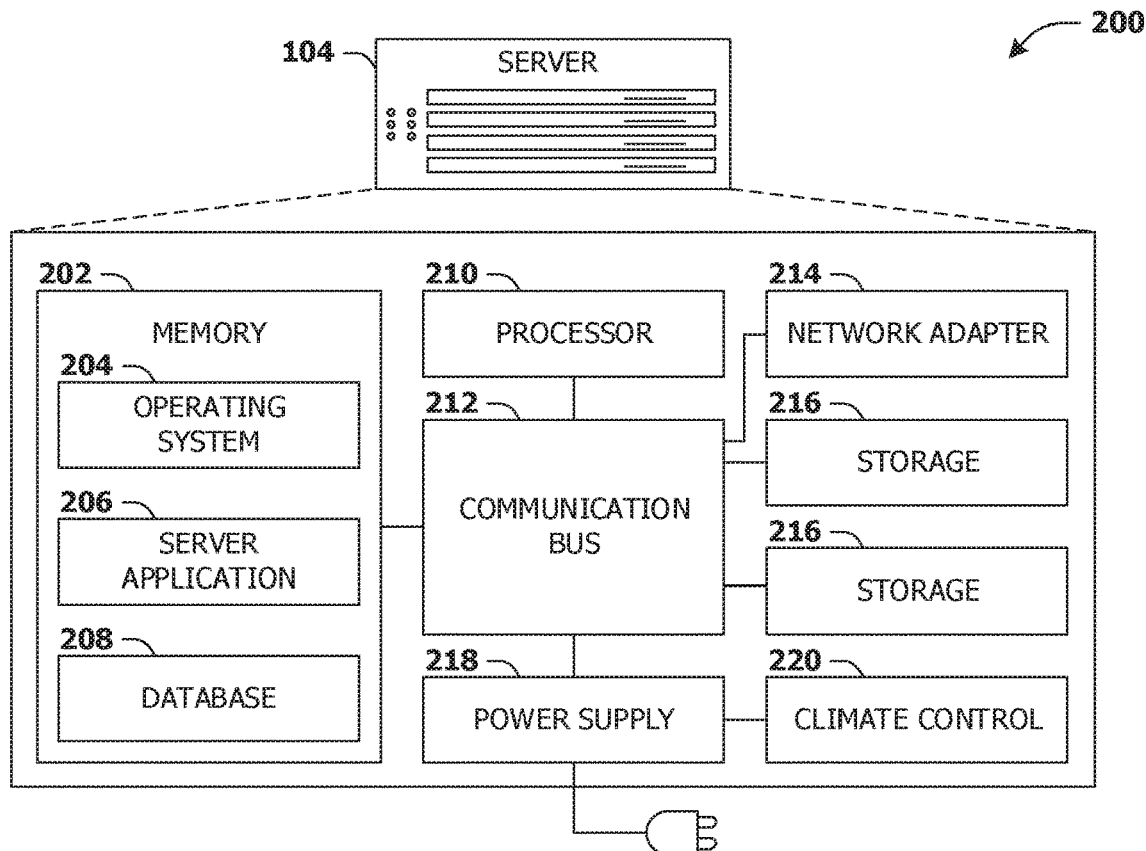
FIG. 2 is an illustration of a scenario involving an exemplary configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
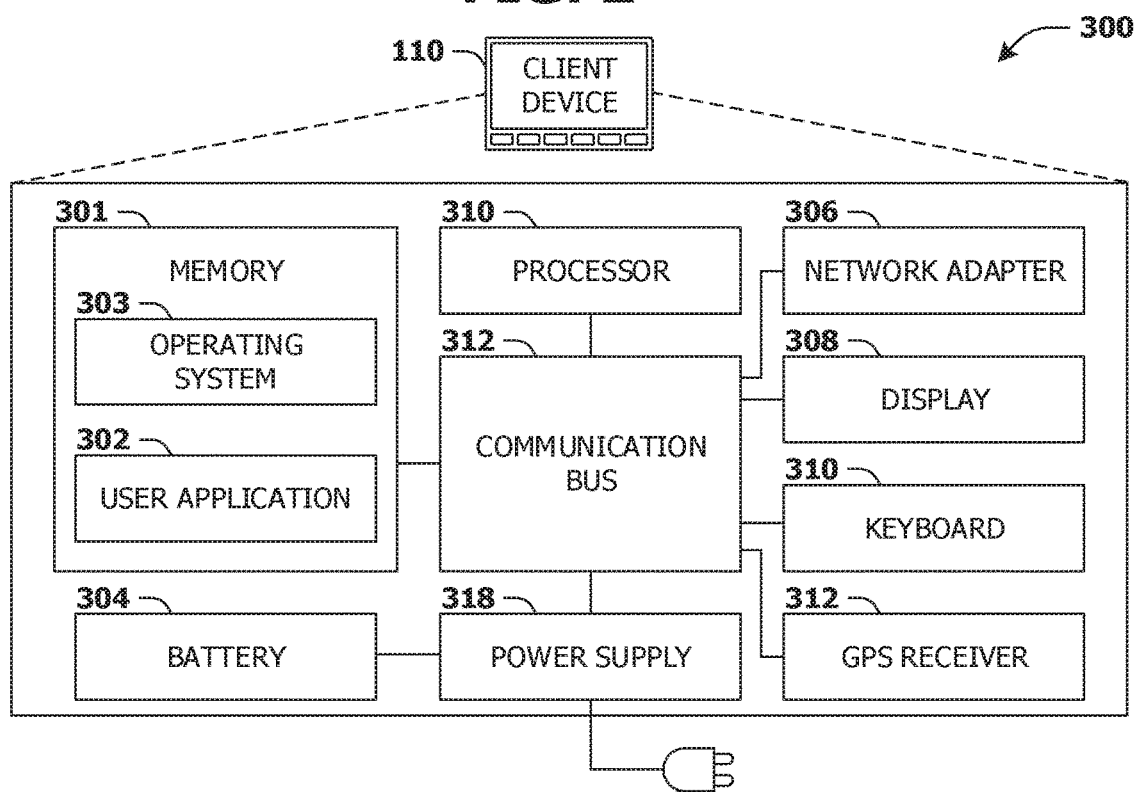
FIG. 3 is an illustration of a scenario involving an exemplary configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more techniques and/or systems for sending push notifications of content items to client devices are provided herein. A system, such as a software search application, search engine, etc., may be configured to search a content source (e.g., the internet, a website, a social network, an image sharing service, etc.) for content items that are potentially relevant to a search query submitted by a user. For example, the user may desire to follow a particular topic that is currently trending in the news (e.g. the war in Iraq, pre-season football scores, etc.). While the user may want the most up to date information on the topic, the user may not want to actively search for the latest updates on an hourly, daily, weekly, or monthly basis. Moreover, while the user may want up-to-date information on the topic, the user may not want to be inundated with irrelevant (e.g. if the search query entered is directed to the president and the war in Iraq, the user may not want to see content items directed to the president's healthcare plan, etc.), inaccurate (e.g. the user may want content items from trustworthy sources, such as major news hubs, but not blogs, message boards, etc.) and/or uninteresting content items. Accordingly, as provided herein, a content source, such a news feed, may be monitored for recent content items that are related to the search query, and a push notification may be sent to the user when a relevant content item is discovered. Thus, human interaction may be reduced so that the user does not have to run the same search over and over again to identify up-to-date content. The user may set customized filters based upon a user profile (e.g., age, location, gender, etc.), a user preference (e.g., favorite author, favorite website, etc.) and/or the user's past activity on a network/system (e.g., a search history of the user, etc.). The customized filters provide the user with content items that may intrigue and engage the user, and may filter out the content items with which the user may not be interested. Furthermore, the search query may be expanded to uncover additional content items that may have been missed by searching based upon merely the search query. Accordingly, by expanding the search query, the system may increase the quantity of potentially relevant content items that are returned as search results or through notifications to the user.

Figure 4:
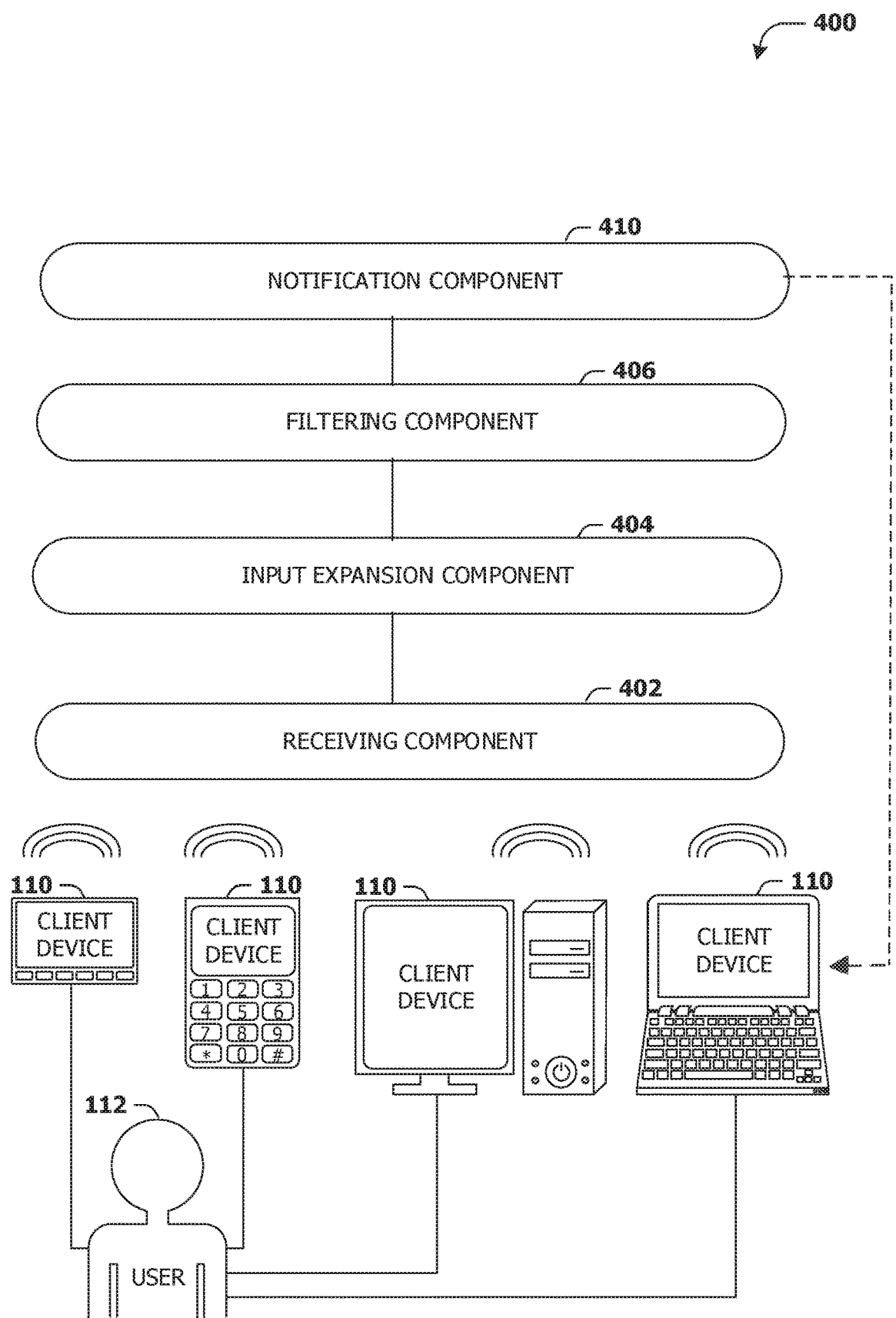
FIG. 4 is a component block diagram illustrating an exemplary system for sending push notifications of content items to client devices in accordance with some embodiments, where the content items are filtered.

FIG. 4 illustrates an example of a system 400 for sending push notifications of personalized content items to client devices. The system 400 comprises a receiving component 402, an input expansion component 404, a filtering component 406, and/or a notification component 408. In an example, the receiving component 402 may be configured to receive an input from a user 112. The input, such as a search query, may comprise at least one of a term or phrase (e.g., "what is the president's stance on the war"). For example, the input may comprise a search query directed to a news topic or entity that the user 112 wants to follow (e.g., president Obama, football playoffs, war in Iraq, etc.). In an example, the user 112 may enter multiple inputs. The user 112 may enter the input via a client device 110, such as a smart phone, tablet, laptop, or personal computer. In an example, the client device 110 comprises a mobile device, such as a smart phone or tablet, connected to a content source, such as a wide area network (internet) or a private network, via a wireless connection.

The input expansion component 404 may be configured to expand the input that the user 112 entered to obtain an expanded user interest. The input may be expanded to comprise a term, a phrase, a co-occurring term, an entity, a concept, a category, and/or a topic. The expanded user interest may be used to identify content items that may be relevant to the user 112, which may not have been uncovered by a search utilizing merely the input. In an example, the input may be expanded by searching an electronic encyclopedia or an electronic dictionary for synonyms, acronyms, and/or terms that are related to the input (e.g., if the input is "president", the input could be expanded to include "Commander in Chief", "Head of State", "POTUS" "Chief of State", "Washington", "White House", and/or "Democratic party", etc.). In an example, the input may be mapped to a normalized feature by an electronic dictionary or an electronic encyclopedia. In an example, the content item may be mapped into a set of normalized features by the electronic dictionary or the electronic encyclopedia. The dot product between these normalized features may be used to match the input to the content items.

In another example, an input term within the input may be identified (e.g., "president"). A content item, such as a news article, may be searched to identify co-occurring terms within the content item (e.g., a news article may be searched for terms that co-occur with the input term "president"). In an example, the expanded user interest comprises at least one noun that co-occurs with at least part of the input entered by the user 112 (e.g., the news article may comprise terms, such as war, politics, demarcate, Biden, etc., that co-occur with the input term "president").

In another example, the input expansion component 404 may be configured to expand the input by utilizing a topic model and/or a categorizer, such as a multi-class categorizer, to obtain the expanded user interest. A term, a phrase, an entity, and/or a concept may be identified in a content item and resolved into a category and/or a topic (e.g., the term "president" may be resolved into a political category). In an example, the input may be treated as a search query and the categorizer may process the content items obtained by a search using the search query (e.g., the input president may return political content items, war content items, economic content item, etc.). The categorizer may process the content items to identify a category based upon the input and/or the results obtained by the search (e.g., if the majority of the content items are political content items, the categorizer may identify a political category for the input). In another example, the content items, obtained as the search results, are processed through a topic model to generate and/or identify a topic (e.g., if a majority of the search results are political content items, then the topic model may generate a political topic).

The filtering component 406 may be configured to filter content items from a content source (e.g., an aggregated content source, a news feed, a social media feed, a twitter feed, a rich site summary (RSS) feed, etc.) based upon the expanded user interest to obtain a set of filtered content items. In an example, the content source is updated in real-time. The filtered content items may comprise news articles, sports statistics, travel deals, social network posts, stock updates, and/or product pricing information. In an example, the content items are filtered by comparing the content items to the input (e.g., comparing a war story content item to the search query "president") and/or the expanded user interest (e.g., comparing a war story content item to the expanded user interest "Washington", etc.). In an example, the comparison is based upon a similarity measurement (e.g., how many times the input term "president" and/or an expanded user interest "Washington" appears in the war story content item). In an example, the similarity measurement is calculated by assigning a similarity score to a content item based upon the expanded user interest. In an example, if the content item has a similarity score that meets or exceeds a predetermined threshold, then the content item is tagged as being relevant to the input from the user 112 (e.g., the war story content item is tagged as relevant to the input of "president" based upon the war story content item having a similarity score greater than a threshold of 70%).

The filtering component 406 may comprise a categorizer and/or a topic model. In an example, the categorizer may be used to filter the content items based upon the category generated by the input expansion component 404 (e.g., the political category, etc.). The content items from the content source may be filtered by the categorizer to determine if a content item matches the category generated by the categorizer (e.g., filtering war story content items thought a political category). In an example, the categorizer may generate a category score based upon how well a content item matches the category (e.g., a 70% match between a political category and the war story content item). The content items that return the top category scores may be tagged as relevant and added to the set of filtered content items. In another example, the topic model may be used to filter content items based upon the topic generated by the topic model (e.g., a political topic). In an example, the topic model generates a topic score based upon the correlation between a content item and the topic generated by the topic model (e.g., a 70% match between a political topic and the war story content item). The content items that yield a topic score that meets or exceeds a pre-determined threshold may be added to the set of filtered content items. In an example, the similarity score is based upon at least one of the category score or the topic score.

The set of filtered content items may be maintained within a cache. A cache expiration period may be defined for the set of filtered content items. In an example, the cache expiration period can be between about 6 hours to about 48 hours. At the expiration of the cache expiration period, one or more expired filtered content items may be removed from the cache.

The notification component 408 may be configured to construct and/or send a push notification (e.g., a war story content item notification) to the client device 110 of the user 112. For example, the push notification may be constructed as a packet comprising a notification to display the war story content item and a client device token that identifies the client device 110. The packet may be sent to a push notification server which in turn pushes the packet to the client device 110. The push notification may be displayed on the client device 110 as a device alert notification. In an example, the notification component 408 may be configured to send the push notification to an operating system of the client device 110 (e.g., a mobile alert or other push notification to a mobile device). The push notification may include instruction for the operating system (e.g., a smart phone operating system) to display one or more filtered content items (e.g., the war story) as a device alert notification. The device alert notification may comprise at least one of a visual notification, (e.g., a banner or a badge), a tactile notification (e.g., a vibration), or an audio notification. The push notification may be configured to alert the user 112 to the number of filtered content items uncovered based upon the input (e.g., the search query) and/or to the number of unacknowledged filtered content items waiting to be viewed (e.g., five new war content items and three unacknowledged war content items).

Figure 5:
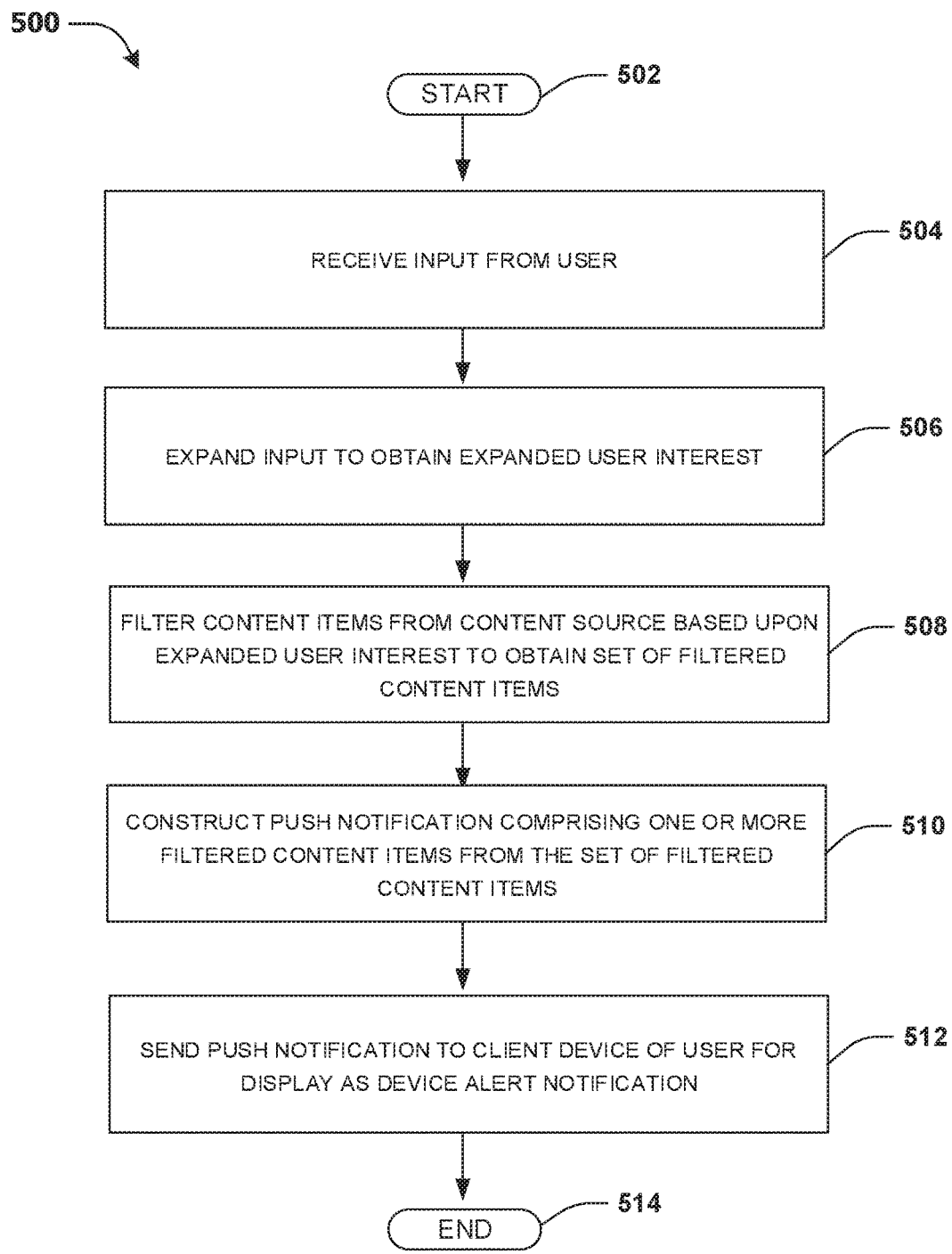
FIG. 5 is a flow chart illustrating an exemplary method of sending push notifications of content items to client devices in accordance with some embodiments, where the content items are filtered.

An embodiment of sending push notifications of personalized content items to client devices is illustrated by an exemplary method 500 of FIG. 5. At 502, the method starts. At 504, an input is received from a user. The input may be sent from a client device, such as a smart phone or tablet, etc. The input may be received via a wireless network. The input may be sent from an operating system of a mobile device with an instruction to actively search/monitor a content source (e.g., news feeds, social network feeds, licensed content feeds, blog posts, etc.) for content items related to the input. In an example, the input may be a search query comprising a term or a phrase (e.g., football playoffs).

At 506, the input may be expanded to obtain an expanded user interest. The expanded user interest may comprise at least one of a term, a phrase, a co-occurring term, an entity, a concept, a category, or a topic. For example, an electronic dictionary, thesaurus, and/or encyclopedia may be searched to find terms, phrases, entities, and/or concepts associated with the input (e.g., American football, gridiron, etc.). In another example, the input may be used as a search query to identify content items, containing the input, from a content source. The identified content items may be searched to identify any co-occurring terms within the content items (e.g., quarterback, receiver, offence, a Cleveland football team, a Pittsburgh football team, super bowl, and/or other co-occurring terms that may occur with the input "football playoffs"). In another example, the input may be expanded by processing the input through a categorizer and/or a topic model to obtain a topic and/or category associated with the input (e.g., playoff category, trade category, injured player category, upcoming games category, rules category, super bowl category, etc.).

At 508, the content items from the content source are filtered based upon the expanded user interest to obtain a set of filtered content items. The content items may be filtered from a content source that updates the content items in real time (e.g., a news feed, a social media feed, a blog feed, a licensed content feed, an RSS feed, etc.). The content source may be continuously or periodically searched in order to identify new content items. In an example, a set of filtered content items may be generated by comparing the content items from a content source to the expanded user interest (e.g., comparing a playoff content item and a baseball content item to the expanded interest for football playoffs). The comparison may be performed based upon a similarity measurement. In an example, the similarity measurement comprises a similarity score that is assigned to a content item (e.g., an 80% similarity score between the football playoff category and the playoff content item, and a 10% score between the football playoff category and the baseball content item). The similarity score may be calculated by comparing the content item to the expanded user interest. In an example, a content item may be compared to a category and/or a topic by the categorizer and/or the topic model (e.g., comparing a playoff content item to a super bowl category). The content item can be compared to obtain a category score and/or a topic score (e.g., a 75% category score when comparing a playoff content item to a super bowl category). At least one of the category score or the topic score may be used to calculate the similarity score. In an example, if the content item has a similarity score that meets and/or exceeds a predetermined threshold, then the content item is deemed to be relevant to the input that the user entered (e.g., if the threshold is 60% and the playoff content item has a similarity score of 80%, then the playoff content item may be tagged as being relevant to the input based upon the playoff content item having a similarity score greater than a threshold of 60%).

The set of filtered content items may be maintained within a cache, which has a cache expiration period. The cache expiration period may be between about 4 hours to about 60 hours. At the end of the cache expiration period, one or more expired filtered content items may be removed from the cache.

At 510, a push notification is constructed (e.g., a packet comprising a notification to display the playoff content item and a client device token identifying a client device). The push notification may comprise one or more filtered content items from the set of filtered content items (e.g., the playoff content item, etc.). The push notification may be configured as a display list, where recent filtered content items are presented first in the display list (e.g., a playoff content item that was published 3 hours ago is displayed before a playoff content item that was published 26 hours ago).

At 512, the push notification is sent to a client device of the user for display as a device alert notification (e.g., the packet is sent to a push notification server which in turn pushes the packet to the client device). The push notification may be sent to the client device when a new filtered content (e.g., a playoff game score content item) item is obtained. In an example, the push notification is sent to an operating system of the client device from a server. The push notification may include instruction for the operating system to display one or more filtered content items as a device alert notification. In an example, the device alert notification may comprise at least one of a visual notification (e.g., a banner or a badge), a tactile notification (e.g., a vibration), or an audio notification. At 514, the method 500 ends.

Figure 6:
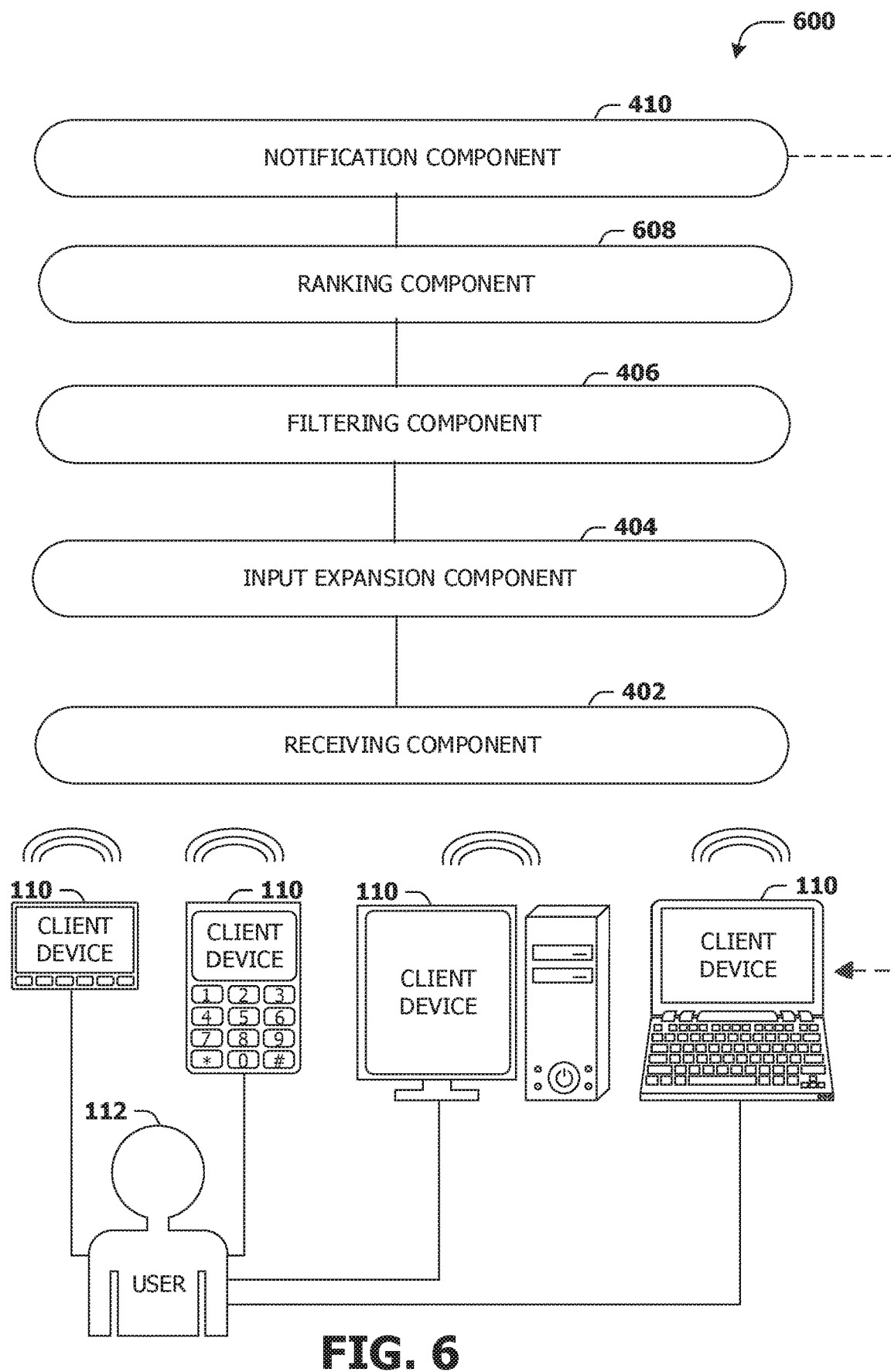
FIG. 6 is a component block diagram illustrating an exemplary system for sending push notifications of content items to client devices in accordance with some embodiments, where filtered content items are ranked.

FIG. 6 illustrates an example of a system 600 for sending push notifications of personalized content items to client devices. The system 600 comprises at least one of a receiving component 402, an input expansion component 404, a filtering component 406, a ranking component 608, or a notification component 410.

The receiving component 402 may be configured to receive an input from a user (e.g., romantic T.V. shows on Thursday night.). The input expansion component 404 may be configured to expand the input to obtain an expanded user interest (e.g., romcoms, romantic comedies, television, boob tube, idiot box, telly, etc.). The filtering component 406 may be configured to filter content items from a content source (e.g., an aggregated content source, a news feed, a social media feed, etc.) based upon the expanded user interest to obtain a set of filtered content items (e.g., an action T.V. show content item may be filtered out, but a romcom content item may be kept).

The ranking component 608 may be configured to rank the set of filtered content items to create a ranked set of filtered content items (e.g., ranked from most relevant to least relevant; ranked based upon popularity in a category; ranked based upon the number of "likes" a content item received on a social network, etc.). The filtered content items may be ranked based upon a ranking metric. The ranking metric may be configured to rank the set of filtered content items based upon at least one of a user interest (e.g., favorite actor, favorite director, favorite genera, etc.), a publication date (e.g., ranking the most recent television content items first), or the global popularity of a content item. The user interest may comprise a user profile, a user preference, and/or a past interaction on a network/website. At least one of the user profile, the user preference, or the past interaction may comprise an age of the user, a gender of the user, a location of the user, a publisher preference of the user (e.g., favorite network, etc.), an author preference of the user (e.g., favorite author, director, producer, etc.), an information medium preference of the user (e.g., broadcast television, VHS, DVD, computer streaming services, etc.), a search history of the user (e.g., television shows that the user has searched/watched), and/or a social media history of the user (e.g., television content items the user has liked, shared, favorited, retweeted, posted, etc.).

In an example, if the user generally interacts with content items that contain text (e.g., news articles) more than content items that contain videos, the ranking component 608 may rank content items containing text higher than those containing videos. In another example, the ranking component 608 may be configured to account for websites that the user visited, bookmarked, searched, and/or shared via a social network. In another example, the ranking component 608 may rank content items based upon the global popularity of a content item to other users that have entered similar inputs and/or have similar interests to the user (e.g., other users that like/searched for romantic T.V. shows). The ranking component 608 may assign a ranking score to a filtered content item based upon the ranking metric (e.g., a first romcom T.V. show content item that does not contain the user's favorite actress may receive a ranking score of 70% whereas a second romcom T.V. show content item containing the user's favorite actress may receive a ranking score of 92%). The ranking score may be used to indicate which content items the user may find the most engaging.

The ranking component 608 may utilize at least one of a machine learned model to rank the set of filtered content items. A ranking framework for evaluating a spoken-language dialog system, such as PARADISE (PARAdigm for Dialogue System Evaluation), may be used in collaboration with the machine learned model.

The notification component 410 may be configured to construct and/or send a push notification to a client device (e.g., smartphone, tablet, etc.) of the user. The push notification may be displayed as a device alert notification (e.g., a banner, badge, popup, etc.). In an example, the notification component 410 may be configured to send a push notification to an operating system of a client device, such as a mobile device. The push notification may include instruction for the operating system to display one or more of the ranked set of filtered content items as a device alert notification. The ranked set of filtered content items may be displayed based upon the ranking score associated with a filtered content item. For example, the filtered content item with the highest ranking score may be displayed before filtered content items having lower ranking scores (e.g., the second romcom T.V. show content item having a 92% ranking score may be displayed before the first romcom T.V. show content item having a 70% ranking score).

Figure 7:
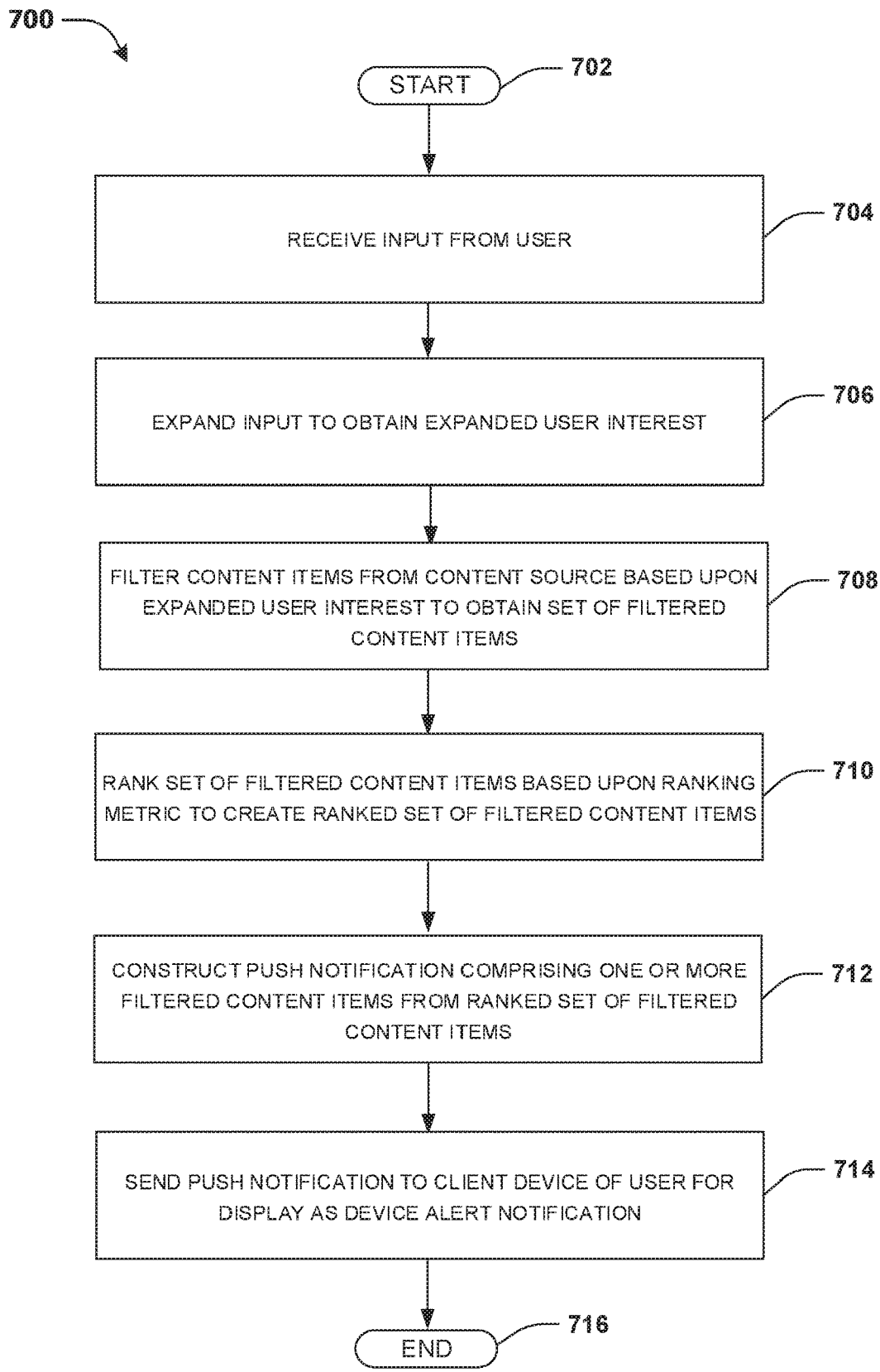
FIG. 7 is a flow chart illustrating an exemplary method of sending push notifications of content items to client devices in accordance with some embodiments, where filtered content items are ranked.

An embodiment of sending push notifications of personalized content items to client devices is illustrated by an exemplary method 700 of FIG. 7. At 702, the method starts. At 704, an input is received from a user (e.g., European meals). At 706, the input may be expanded to obtain an expanded user interest (e.g., French, Belgium, a food category, a French meals category, an Italian meals category, etc.). At 708, the content items from the content source are filtered based upon the expanded user interest to obtain a set of filtered content items (e.g., an African meal content item may be filtered out whereas the French meal content item and the Italian meal content item may be kept).

At 710, the set of filtered content items is ranked based upon a ranking metric to create a ranked set of filtered content items. The ranking metric may be configured to rank the set of filtered content items based upon at least one of a user profile, a user preference, a past interaction on a network/website, a publishing date, or the global popularity of a content item. At least one of the user profile, the user preference, or the past interaction may be configured to rank a filtered content item based upon an age of the user, a gender of the user, a location of the user, a publisher preference of the user, an author preference of the user, an information medium preference of the user, a search history of the user, and/or a social media history of the user. In an example, the filtered content items may be assigned a ranking score based upon the ranking metric (e.g., if the user has liked French cooking recipe content items in the past, then the ranking metric may rank the French meal content item higher than the Italian meal content item).

At 712, a push notification is constructed (e.g., a packet comprising a notification to display the French content item, a notification to display the Italian content item, an instruction to display the French meal content item before the Italian meal content item, and a client device token). The push notification may comprise one or more filtered content items from the ranked set of filtered content items. One or more filtered content items may be organized within the push notification based upon the ranking score of the filtered content item. At 714, the push notification is sent to a client device of the user for display as a device alert notification (e.g., the packet is sent to a push notification server which in turn pushes the packet to the client device). At 716, the method 700 ends.

Figure 8:
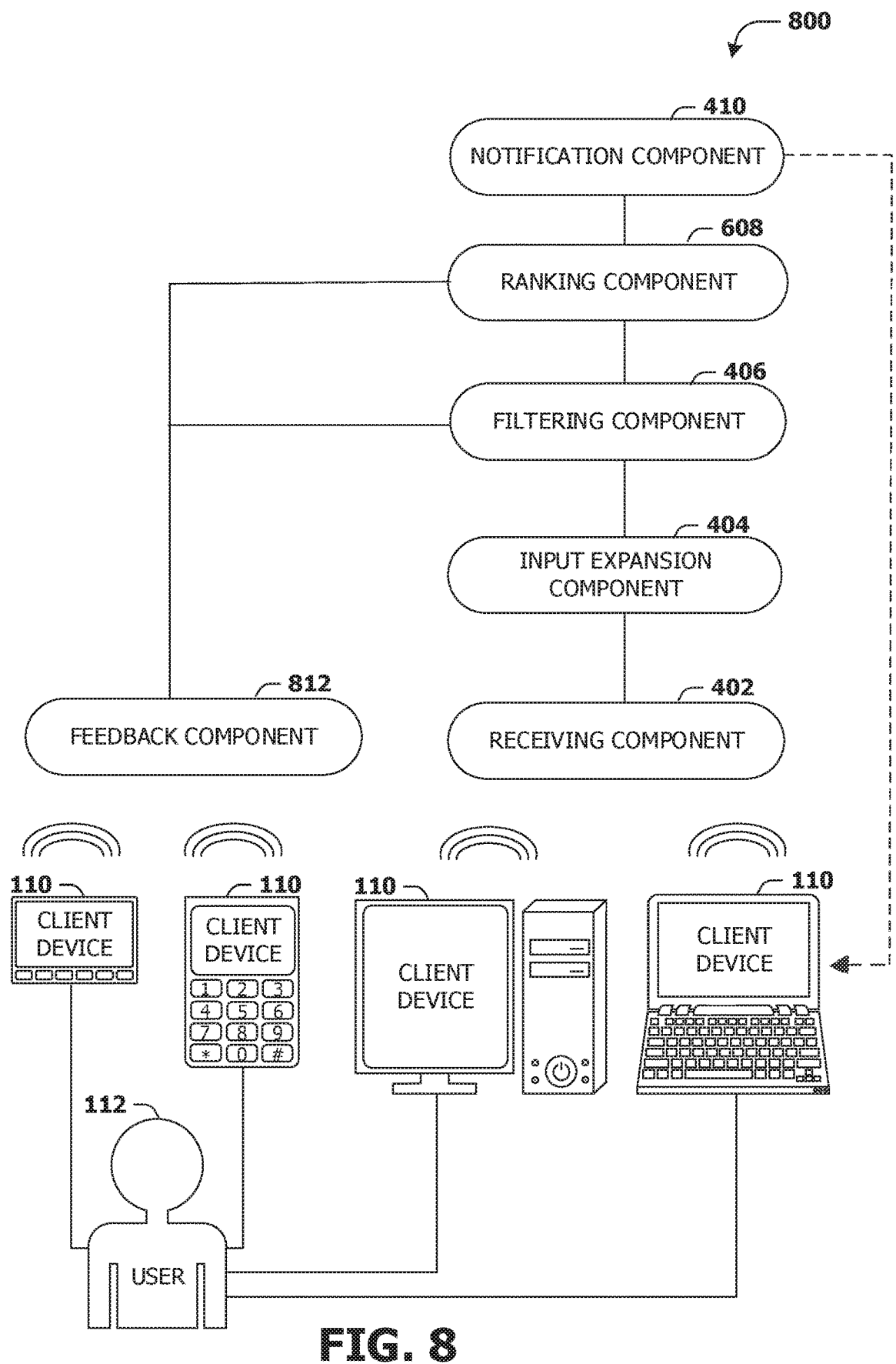
FIG. 8 is a component block diagram illustrating an exemplary system for sending push notifications of content items to client devices in accordance with some embodiments, where a user provides feedback.

FIG. 8 illustrates an example of a system 800 for sending push notifications of personalized content items to client devices. The system 800 comprises at least one of a receiving component 402, an input expansion component 404, a filtering component 406, a ranking component 608, a notification component 410, or a feedback component 812.

The receiving component 402 may be configured to receive an input from a user (e.g., a search query "American muscle cars"). The input expansion component 404 may be configured to expand the input to obtain an expanded user interest (e.g., Mustang, Camaro, GTO, an American car category, a pre-1970's car category, etc.). The filtering component 406 may be configured to filter content items from a content source based upon the expanded user interest to obtain a set of filtered content items (e.g., a Mustang car content item and a GTO car content item may be kept, whereas a Japanese car content item may be filtered out). The ranking component 608 may be configured to rank the set of filtered content items to create a ranked set of filtered content items. In an example, the filtered content items are ranked based upon a ranking metric (e.g., if the user has bookmarked several pages about Mustangs, then a Mustang car content item could be ranked higher than a GTO car content item). The notification component 410 may be configured to construct a push notification comprising one or more filtered content items from the ranked set of filter content items. The notification component 410 may be configured to send the push notification to a client device of the user.

The feedback component 812 may be configured to allow the user to rate the filtered content items (e.g., the user could give the Mustang car content item a thumbs up if the user enjoyed the mustang car content item, whereas the user could give the Camaro car content item a thumbs down if the user did not enjoy the Camaro car content item). The filtered content items may be rated by the user 112, which may be used to assign a feedback score to at least one of the filtered content items. The feedback component 812 may send the feedback score to a server. The feedback score may indicate how relevant at least one of the filtered content items was to the user. The feedback score may be assigned by the user using a numerical value (e.g., on a scale of one to ten, the user could assign the Mustang car content item a 7 and the Camaro car content item a 2). In an example, at least one of the filtering component 806 or the ranking component 808 is configurable to utilize the feedback score to improve the filtering and/or the ranking of content items (e.g., the filtering component could be configured to filter out content items directed to Camaro car content items and/or the ranking component could be configured to rank Mustang car content items higher in the ranked set of filtered content items).

Figure 9:
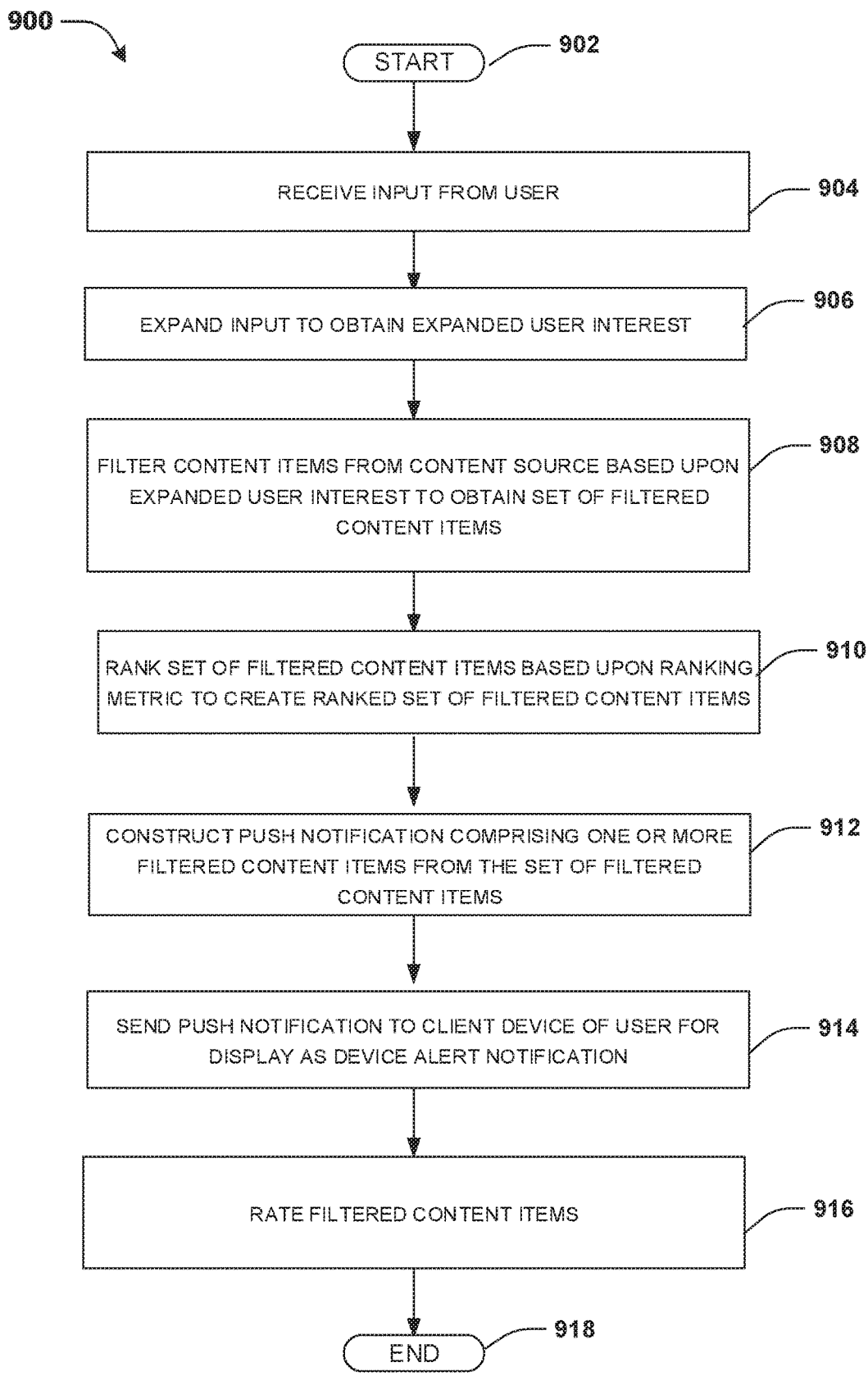
FIG. 9 is a flow chart illustrating an exemplary method of sending push notifications of content items to client devices in accordance with some embodiments, where a user provides feedback.

An embodiment of sending push notifications of personalized content items to client devices is illustrated by an exemplary method 900 of FIG. 9. At 902, the method starts. At 904, an input is received from the user (e.g., a search query "dogs"). At 906, the input may be expanded to obtain an expanded user interest (e.g., the input can be expanded to include canine, K9, Rottweiler, German Shepard, a long haired dog category, a short haired dog category, or a grooming topic). The expanded user interest may comprise at least one of a term, a phrase, a co-occurring term, an entity, a concept, a category, or a topic. At 908, the content items from the content source are filtered based upon the expanded user interest to obtain a set of filtered content items (e.g., a racing dog content item, a breeding dog content item, a guard dog content item, and a German Shepard content item may be kept, whereas a cat content item may be filtered out). At 910, the set of filtered content items is ranked based upon a ranking metric to create a ranked set of filtered content items. In an example, the filtered content items are ranked based upon a ranking score (e.g., if a user has followed a guard dog content item on a social networking site, then the guard dog content item could receive a ranking score of 91, the German Shepard content item could receive a ranking score of 88, the breeding dog content item could receive a ranking score of 70, and the racing dog content item could receive a ranking score of 33. Thus, the guard dog content item may be ranked highest based upon the guard dog content item having the highest ranking score of 91). At 912, a push notification is constructed. The push notification may comprise one or more filtered content items from the ranked set of filtered content items (e.g., a packet comprising a notification to display the guard dog content item, the German Shepard content item, the breeding dog content item, the racing dog content item, an instruction to display the content items in order based upon the content items ranking score, and a client device token identifying a client device). At 914, the push notification is sent to the client device of the user for display as a device alert notification (e.g., the packet is sent to a push notification server which in turn pushes the packet to the client device). At 916, at least one of the filtered content items is rated. In an example, the user rates the filtered content items by assigning a feedback score to at least one of the filtered content items (e.g., the user could indicate that he liked the guard dog content item, the racing dog content item, and the German Shepard dog content item by selecting a "+" symbol, and the user could indicate that he did not like the breeding dog content item by selecting a "−" symbol). The feedback score may be used to improve at least one of the filtering of the content items or the ranking of the filtered content items (e.g., the feedback score could be used to configure the ranking component to rank racing dog content items higher than breeding dog content items). At 918, the method 900 ends.

Figure 10:
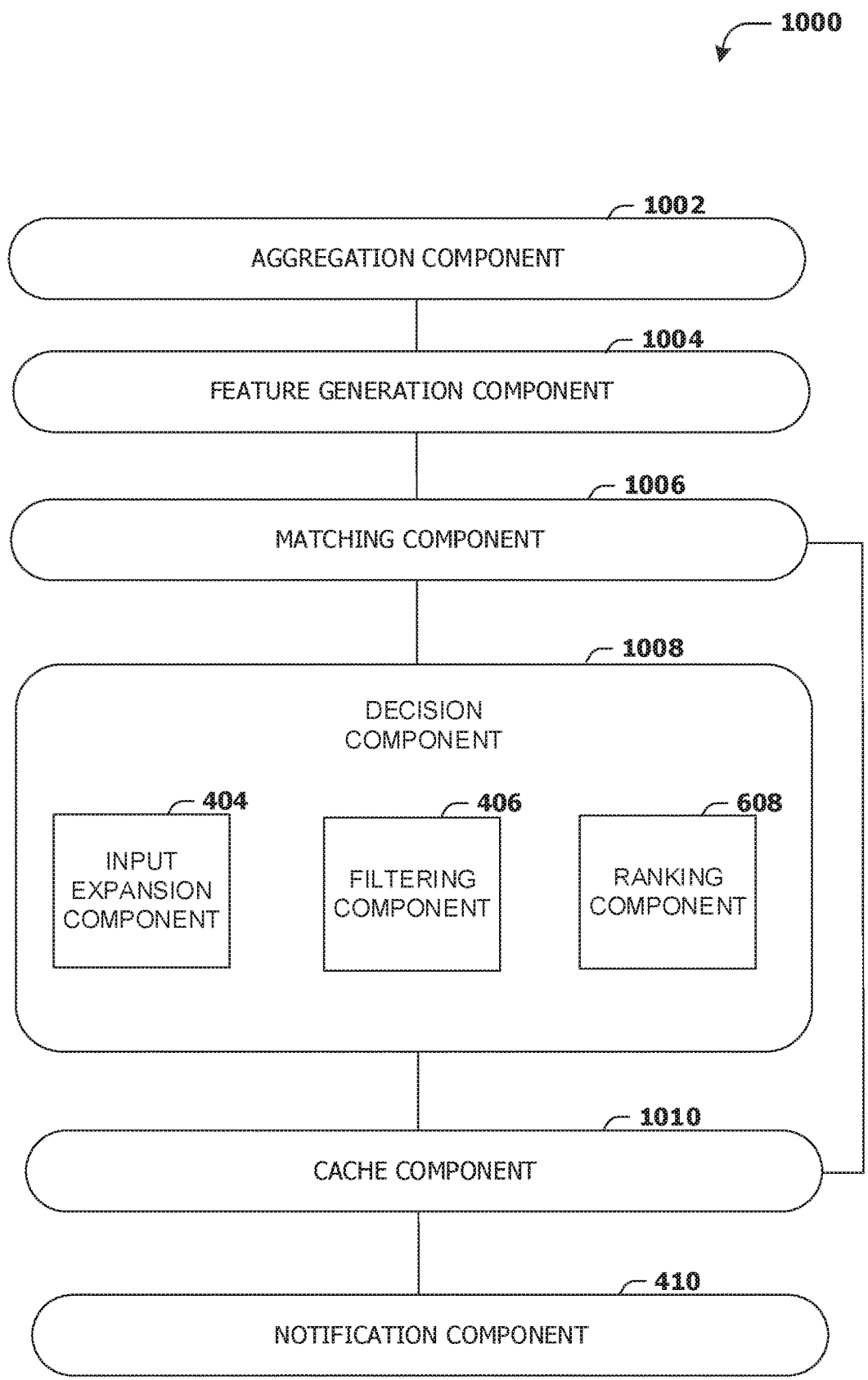
FIG. 10 is a component block diagram illustrating an exemplary system for matching content items to a shard of users in accordance with some embodiments.

FIG. 10 illustrates an example of a system 1000 for matching a content item to a shard of users. The system 1000 comprises a content source aggregator component 1002, a feature generation component 1004, a matching component 1006, and/or a decision component 1008.

The content source aggregator component 1002 may be configured to combine a first content source with a second content source (e.g., combining a social network feed with a licensed content feed) to generate an aggregated content source. In an example, the content source aggregator comprises a storm spout capable of combining the first content source and the second content source into the aggregated content source. The first content source and/or the second content source may comprise at least one of a licensed content feed, a microblog feed, a news feed, a social network feed, or an RSS feed. The aggregated content source may comprise a set of content items from at least one of the first content source or the second content source. The set of content items may comprise news articles, sport statistics, travel deals, social network posts, stock updates, and/or product pricing information. The content source aggregator component 1002 may be configured to schedule a first content item from the aggregated content source for processing by the feature generation component 1004.

The feature generation component 1004 may be configured to extract a first content feature (e.g., a text feature "mars") from a first content item in the set of content items. The content feature may an extracted text feature, an extracted image feature, and/or an extracted video feature. The extracted text feature may comprise a n-gram. In an example, the feature generation component may utilize a content analysis platform to analyze the first content item. The content platform may be configured to extract the first content feature (e.g., news articles may be scanned for the text "mars" or expanded text related to "mars" such as "fourth planet from the sun" and/or "red planet"). In an example, the first content feature comprises a feature vector. The feature vector may be formed by grouping two or more content features together in a storm tuple (e.g., grouping a first text of "mars" with a second extracted image metatag of "red planet").

The matching component 1006 may be configured to match the first content feature of the first content item to a first user feature for a first shard of users to obtain a recommended content item for the first shard of users (e.g., a science fiction mars content item, a mars rover content item, and/or a mission to mars content item can be matched to a group of users that have indicated an interest in mars). The first feature from the first content item may be matched to a first shard of users having a first user feature by utilizing a dot product. In an example, the first content feature may be matched to one or more shards of users in parallel. In an example, the matching component 1006 may determine if the first user feature for the first shard of users and a second user feature for a second shard of users match the first content feature of the first content item (e.g., if a first group of users have expressed an interest in mars and a second group of users has expressed an interest in cars, then the science fiction mars content item, the mars rover content item, and the mission to mars content item may be matched to the first group of users but not to the second group of users). If the first content feature matches the first user feature, then the first content item is identified as a recommended content item for the first shard of users. If the second content feature does not match the first content feature, then the first content item is not identified as the recommended content item for the second shard of users.

In an example, the recommended content item may be sent to a cache component 1010. In an example, the recommended content item may be sent to the cache component 1010 along with user identifiers for the users within the first shard of users (e.g., the science fiction mars content item, the mars rover content item, and the mission to mars content item could be sent to the cache component 1010 to be stored along with an identifier for the first group of users. The science fiction mars content item, the mars rover content item, and/or the mission to mars content item could then be accessed by a first user within the first group of users through a mobile application on a smartphone/tablet). In an example, the recommended content item and the user identifier are cataloged and stored until serving time (e.g., further processed/filtered and/or sent to a first user within the first group of users). The matching component 1006 may reduce the number of content items that are cataloged/indexed for a user (e.g., reduce number of content items that are searched as serving time and/or the system resources need at serving time).

In another example the recommended content item may be sent to a decision component. The recommended content item may be utilized as a content source for a decision component 1008 (e.g., the science fiction mars content item, the mars rover content item, and the mission to mars content item could be sent to the decision component 1008, such as systems 400, 600, or 800, to be filtered and/or ranked for the first user within the first group of users).

The decision component 1008 may comprise at least one of an input expansion component 404, a filtering component 406, or a ranking component 608. The decision component 1008 may be configured to filter the recommended content item from a set of recommended content items based upon a user interest of the first user to obtain a filtered content item. The recommended content item may be filtered by comparing the first content feature of the first content item to the user interest of the first user (e.g. if a first user from within the first group of users has a user interest in scientifically accurate mars content items, then the science fiction mars content item may be filtered out for the first user and the mars rover content item and the mission to mars content item may be kept). The comparison may be based upon a similarity measurement. In an example, the similarity measurement is calculated by assigning a similarity score to the first content item based upon the user interest of the first user (e.g., the mission to mars content item may receive a similarity score of 80, the mars rover content item may receive a similarity score of 75, and the science fiction mars content item may receive a similarity score of 35). In an example, if a content item has a similarity score that meets and/or exceeds a predetermined threshold, then the content item is identified as a filtered content item for the first user and is included in the set of filtered content items for the first user (e.g., if the predetermined threshold is 60, then the mars mission content item and the mars rover content item will be kept and identified as a filtered content item, while the science fiction mars content item will not be kept). The filtered content items within the set of filtered content items may be ranked based upon a ranking score (e.g., if the mission to mars content item receives a ranking score of 65 and the mars rover content item receives a ranking score of 70 based upon the first user interest, then the mars rover content item may be ranked above the mission to mars content for the first user). In an example, the filtered content item is given a unique identifier and sent to the cache component 1010 along with a user identifier for the first user.

If the first user and a second user have user interests that match the first content feature, then the first user and the second user may be grouped together to obtain a filtered shard of users (e.g., if the first user and a second user both have a user interest in life on mars, then the first user and the second user could be grouped together based upon the shared user interest in life on mars). In an example, the filtered content item is given a unique identifier and sent to a cache component along with a user identifier for at least one user in the filtered shard of users.

In an example, the cache component 1010 may be configured to generate a user recommended cache to store the filtered content item and the user identifier. The user recommended cache may be configured to catalog the filtered content items for the first user for fast lookup at serving time.

In another example, cache component 1010 may be configured to send the filtered content item to a notification component (e.g., a packet comprising a notification to display the mission to mars content item, the mars rover content item, an instruction to display the content items in order based upon the content items ranking score, and a client device token). The notification component may be configured to send the filtered content item to the first user via a push notification (e.g., the packet is sent to a push notification server which in turn pushes the packet to the client device).

Figure 11:
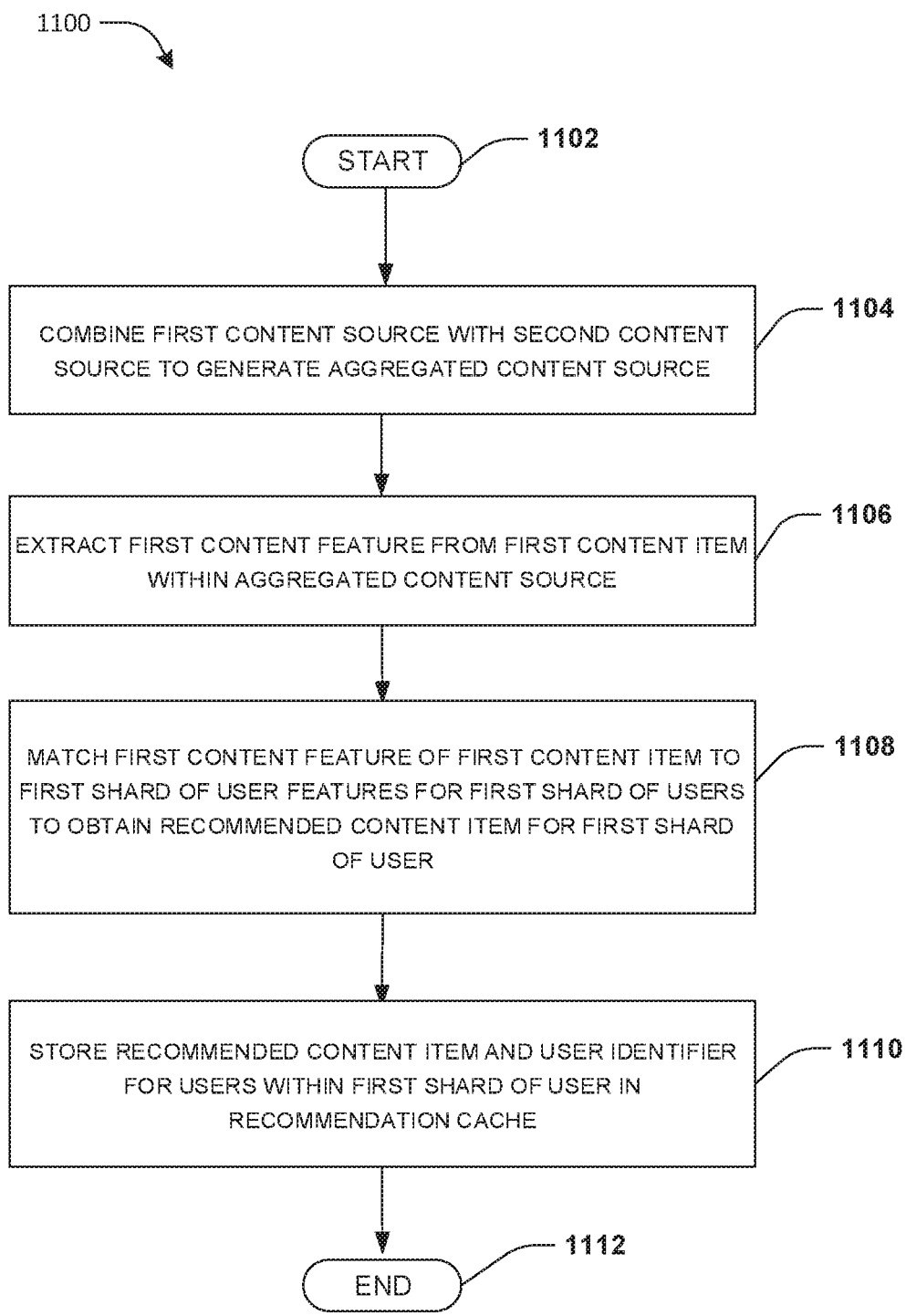
FIG. 11 is a flow chart illustrating an exemplary method of matching content items to a shard of users in accordance with some embodiments.

An embodiment of matching a content item to a shard of users is illustrated by a method 1100 of FIG. 11. At 1102, the method starts. At 1104, a first content source is combined with a second content source to generate an aggregated content source (e.g., an RSS feed and a social media feed are combined to generate an aggregated content source). At 1106, a first content feature is extracted from a first content item within the aggregated content source (e.g., a text feature "Caribbean"). At 1108, the first content feature of the first content item is matched to a first user feature for a first shard of users to obtain a recommended content item for the first shard of users (e.g., a Caribbean travel deal content item, a pirate content item, and a shipwreck artifact content item can be matched to a group of users that have indicated an interest in the "Caribbean"). At 1110, the recommended content item and a user identifier for the users within the first shard of users is stored in a recommended cache (e.g., the Caribbean travel deal content item, the pirate content item, and the shipwreck artifact content item can be grouped and stored with an identifier for a first group of users containing a first user and a second user that have a group interest in the "Caribbean"). At 1112, the method ends.

Matching content items to shards of users and storing at least one of the recommended content items or the filtered content items in a recommendation cache can allow for fast lookup at serving time. Matching content items to shards of users can also improve the utilization of hardware resources by reducing the number of content items a system must process for a user.

Figure 12:
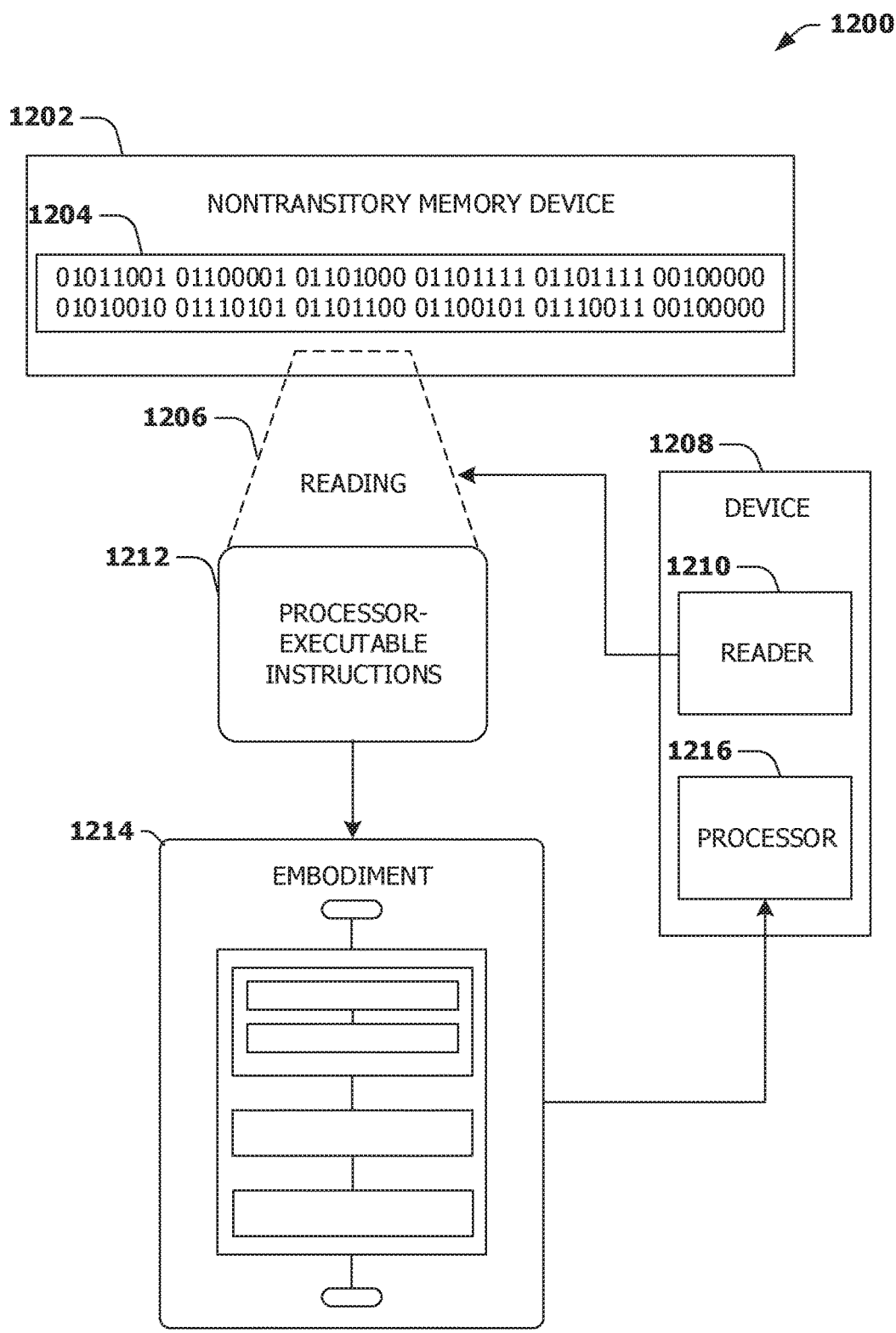
FIG. 12 is an illustration of a scenario featuring an exemplary nontransitory memory device in accordance with one or more of the provisions set forth herein.

FIG. 12 is an illustration of a scenario 1200 involving an exemplary nontransitory memory device 1202. The nontransitory memory device 1202 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The exemplary nontransitory memory device 1202 stores computer-readable data 1204 that, when subjected to reading 1206 by a reader 1210 of a device 1208 (e.g., a read head of a hard disk drive, or a read operation invoked on a solid-state storage device), express processor-executable instructions 1212. In an example, the processor-executable instructions, when executed on a processor 1216 of the device 1208, are configured to perform a method, such as at least some of the exemplary methods 500, 700, 900 and/or 1100 of FIGS. 5, 7, 9, and/or 11 for example. In an example, the processor-executable instructions, when executed on the processor 1216 of the device 1208, are configured to implement a system, such as at least some of systems 400, 600, 800, and/or 1000 of FIGS. 4, 6, 8, and/or 1000 for example.

2.4. Search Engine and Service

Figure 13:
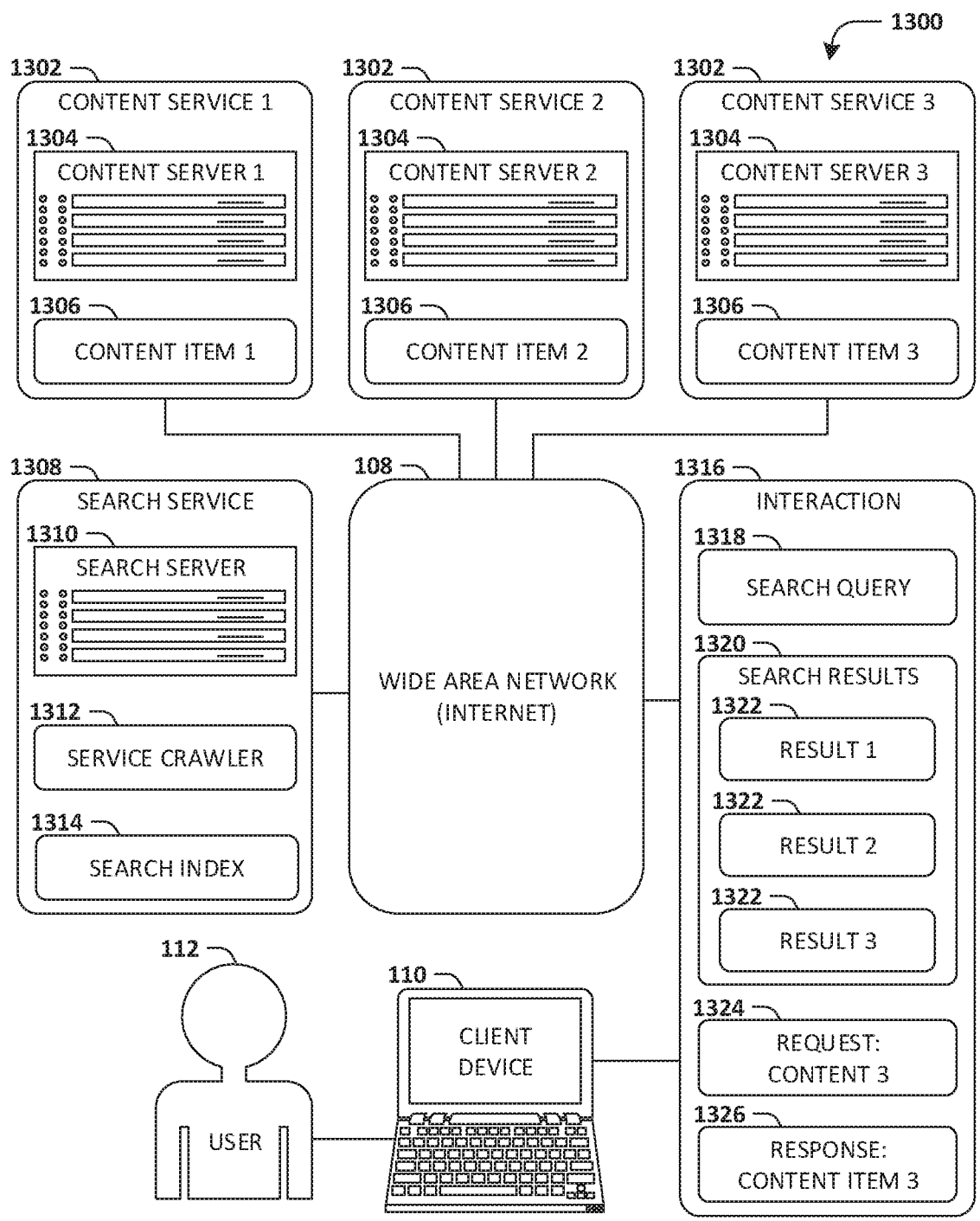
FIG. 13 is a diagram of a scenario of a search engine/service that provides search results in response to a search query in accordance with one or more of the provision set forth herein.

FIG. 13 is an interaction diagram of a scenario 1300 a search engine and/or service that provides search results in response to a search query 1318 on behalf of a user 112 and/or a client device 110. In this scenario 1300, a set of content services 1302 respectively comprise a content server 1304 that provides access to a set of content items 1306, such as text articles, pictures, video, audio, applications, data files, and/or output from devices such as cameras. A search service 1308 is provided, comprising a search server 1310 that interacts with the content services 1302 over the wide area network 108, such as the Internet, to index the content items 1306 provided thereby. For example, the search server 1310 may utilize a service crawler 1312 that iteratively explores the content services 1302 and generates a search index 1314 correlating the content items 1306 of respective services 1302 with various aspects, such as the name, logical address, object type, involved topics, and/or the producer and/or owner of the content item 1306. The search service 1308 may be deployed in a distributed manner across at least two search servers, which may be organized by role (e.g., a first search server maintaining the search index 1314, and a second search server interacting with users and/or client devices) and/or geographically (e.g., various search servers may be provided to service client devices in different physical locations). Components may be duplicated within the search service 1308; e.g., two or more search servers may be provided to facilitate the reliability, response time, and/or scalability of the search service 1308.

As further illustrated in the scenario 1300 of FIG. 13, the user 112 of the client device 110 may engage in an interaction 1316 with the search service 1308 and/or content services 1302 in the following manner. The user 112 may submit the search query 1318, such as a set of search terms, to the search service 1308. The search server 1310 may compare the search query 1318 with the search index 1314 to identify a search result set 1320, comprising one or more search results 1322 that respectively identify a content item 1306 stored by a content service 1302. The search service 1308 may send the search result set 1320 back to the client device 110 in fulfillment of the search query 1318, and the client device 110 may present the search result set 1320 to the user 112. The search results 1322 of the search result set 1320 may also be sorted and/or ranked by relevance to the search query 1318, by chronology, and/or by content service 1302. If the user 112 selects a search result 1322, the client device 110 may submit a request 1324 for the content item 1306 associated with the selected search result 1322 to the consent service 1302 storing the content item 1306. The content server 1304 may provide the content item 1306 in response to the request 1324, and the client device 110 may then present the selected content item 1306 to the user 112. The search service 1308 may also utilize other techniques and/or components, such as an index storage component, a search component, a ranking component, a cache, a profile storage component, a logon component, a profile builder, and one or more application program interfaces (APIs). Many such search services 1308 may be provided, and may variously utilize the techniques presented herein.

In techniques such as those presented herein, search services 1308 may index content provided by the same search service 1308 (e.g., a search service 1308 for a locally stored file system, database, or content library); for content stored by other content services 1302; and/or for content stored by one or more client devices 110 (e.g., a cloud indexing service that indicates the availability of data objects on a distributed set of client devices 110 of the user 112). Additionally, such search services 1308 may index a variety of content, including messages generated by and/or sent to the user 112; text articles; fiction and/or nonfiction stories; facts about topics such as individuals, companies, places; pictures; audio and video recordings; applications; data objects such as files and databases; and/or products and/or services.

Search services 1308 may receive and process many types of search queries 1318 specified in a variety of modalities, including text, handwriting, speech, verbal cues or keywords, gestures, and/or body language. The search queries 1318 may also be specified in a variety of organizational formats, such as a group of keywords, a Boolean logical structure or expression tree, or a natural-language speech. Additionally, the search service 1308 may return search results 1322 that correlate with content items 1306 in various ways, such as a hyperlink to a uniform resource identifier (URI) of the content item 1326; a description of the content item 1306, such as a title, file type, generation date, synopsis, and/or preview version of the content item 1306; and/or a copy of the full content item 1306.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller may be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The invention claimed is:

1. A method, comprising:
receiving an input associated with a user;
expanding the input to obtain an expanded user interest, the expanding comprising:
identifying a term within the input;
identifying a content item based upon the input;
searching the content item for one or more co-occurring terms that co-occur with the term within the content item;
identifying a co-occurring term as one of the one or more co-occurring terms that co-occur with the term within the content item;
obtaining a plurality of content items based upon the input;
processing the plurality of content items obtained based upon the input to identify at least one of one or more categories or one or more topics, wherein the processing comprises determining that a majority of the plurality of content items obtained based upon the input are associated with at least one of a category or a topic; and
including the co-occurring term and at least one of the category or the topic in the expanded user interest; and
filtering content items from a content source based upon the expanded user interest to obtain a set of filtered content items.

2. The method of claim 1, comprising ranking the set of filtered content items based upon a ranking metric to create a ranked set of filtered content items.

3. The method of claim 1, comprising providing for display a notification based upon the set of filtered content items.

4. The method of claim 2, comprising:
maintaining filtered content items, of the ranked set of filtered content items, within a cache;
defining a cache expiration period for the cache; and
responsive to expiration of the cache expiration period for a filtered content item, removing the filtered content item from the cache.

5. The method of claim 4, the cache expiration period comprising between about a 6 hour expiration to about a 48 hour expiration.

6. The method of claim 2, a filtered content item, within the ranked set of filtered content items, comprising at least one of:
a news article, a sports statistic, product pricing information, a travel deal, a social network post, or a stock update.

7. The method of claim 1, the input comprising:
a search query comprising at least one of a second term or a phrase.

8. The method of claim 1, the co-occurring term comprising a noun.

9. The method of claim 2, the ranking comprising:
using at least one of a Gradient Boosting Decision Tree (GBDT) or an XQuery Data Model (XDM) to rank the set of filtered content items.

10. The method of claim 1, comprising:
assigning a rating to a filtered content item based upon user feedback.

11. A system, comprising:
a processor; and
memory comprising processor-executable instructions that when executed by the processor cause the processor to implement:
a receiving component configured to:
receive an input associated with a user;
an input expansion component configured to:
expand the input to obtain an expanded user interest, the expanding comprising:
performing a search query using the input;
obtaining a plurality of content items based upon the search query; and
processing the plurality of content items obtained based upon the search query to identify at least one of one or more categories or one or more topics, wherein the processing comprises at least one of:
processing two or more content items, of the plurality of content items, identified based upon the input through a categorizer to (i) determine a category and (ii) include the category in the expanded user interest responsive to determining that a majority of the two or more content items processed through the categorizer are associated with the category; or
processing two or more content items, of the plurality of content items, identified based upon the input through a topic model to (i) determine a topic and (ii) include the topic in the expanded user interest responsive to determining that a majority of the two or more content items processed through the topic model are associated with the topic; and
a filtering component configured to:
filter content items from a content source based upon the expanded user interest to obtain a set of filtered content items.

12. The system of claim 11, the filtering component configured to:
maintain filtered content items within a cache;
define a cache expiration period for the cache; and
responsive to expiration of the cache expiration period for a filtered content item, remove the filtered content item from the cache.

13. The system of claim 11, wherein the processor-executable instructions cause the processor to implement:
a feedback component configured to:
assign a rating to a filtered content item based upon user feedback.

14. The system of claim 11, the input expansion component configured to:
identify a term within the input.

15. A non-transitory machine readable medium having stored thereon processor-executable instructions that when executed cause performance of operations, the operations comprising:
receiving an input associated with a user;
expanding the input to obtain an expanded user interest, the expanding comprising:
performing a search query using the input;
obtaining a plurality of content items based upon the search query;
processing the plurality of content items obtained based upon the search query to identify at least one of one or more categories or one or more topics, wherein the processing comprises determining that a majority of the plurality of content items obtained based upon the search query performed using the input are associated with at least one of a category or a topic; and including at least one of the category or the topic in the expanded user interest; and filtering content items from a content source based upon the expanded user interest to obtain a set of filtered content items.

16. The non-transitory machine readable medium of claim 15, the operations comprising ranking the set of filtered content items based upon a ranking metric to create a ranked set of filtered content items.

17. The non-transitory machine readable medium of claim 15, the operations comprising sending a notification to an operating system based upon the set of filtered content items.

18. The non-transitory machine readable medium of claim 15, the expanding comprising:

determining that the majority of the plurality of content items are associated with the category; and including the category in the expanded user interest.

19. The non-transitory machine readable medium of claim 15, the expanding comprising:

determining that the majority of the plurality of content items are associated with the topic; and including the topic in the expanded user interest.

20. The non-transitory machine readable medium of claim 15, the operations comprising:

assigning a rating to a filtered content item based upon user feedback.

* * * * *